United States Patent [19]

Deitz et al.

[11] Patent Number: 5,686,584
[45] Date of Patent: Nov. 11, 1997

[54] REACTIVE DYES, THEIR PREPARATION, AND THEIR USE

[75] Inventors: Rolf Deitz, Kandern; Bernhard Müller, Efringen-Kirchen, both of Germany; Athanassios Tzikas, Pratteln, Switzerland

[73] Assignee: Ciba-Geigy Corporation, Tarrytown, N.Y.

[21] Appl. No.: 559,263

[22] Filed: Nov. 15, 1995

[30] Foreign Application Priority Data

Nov. 17, 1994 [CH] Switzerland ............... 3468/94

[51] Int. Cl.$^6$ ............... C09B 62/01; D06P 1/38
[52] U.S. Cl. ............... 534/612; 534/634; 534/635; 534/636; 534/637; 534/642; 8/549
[58] Field of Search ............... 534/612, 634, 534/635, 637, 642

[56] References Cited

U.S. PATENT DOCUMENTS

| | | | |
|---|---|---|---|
| 2,945,021 | 7/1960 | Fasciati et al. | 534/637 |
| 3,462,409 | 8/1969 | Meininger | 534/629 |
| 4,730,038 | 3/1988 | Meininger et al. | 534/637 |
| 4,818,247 | 4/1989 | Lzikas et al. | 8/549 |
| 4,939,243 | 7/1990 | Meininger et al. | 534/625 |
| 5,391,718 | 2/1995 | Lzikas et al. | 534/637 |

FOREIGN PATENT DOCUMENTS

| | | |
|---|---|---|
| 0203505 | 12/1986 | European Pat. Off. |
| 3513260 | 10/1986 | Germany |
| 1080252 | 8/1967 | United Kingdom |
| 1279283 | 6/1972 | United Kingdom |
| 2262533 | 6/1993 | United Kingdom |

OTHER PUBLICATIONS

Chemical Abstracts, 64:848 c (1966).
Chemical Abstracts, No. 106: 103809 (1987).
Chemical Abstracts, No. 110: 136910 (1994).
Chemical Abstracts, vol. 93: 27725x(1980).
Derwent Abstracts, No. 84–248310/40 of SU–A–445,337 (1984).
Chemical Abstracts, No. 106: 34636j (1987).
Chem. Abstract, No. 106: 34636 (1987).

*Primary Examiner*—Fiona T. Powers
*Attorney, Agent, or Firm*—Kevin T. Mansfield

[57] ABSTRACT

Compounds of the formula

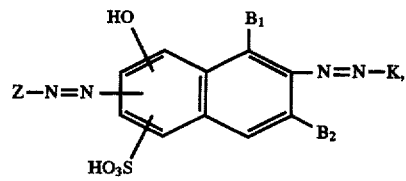

in which the variables are as defined in the claims, and which are suitable as fibre-reactive dyes for dyeing and printing widely varying fibre materials, are described.

11 Claims, No Drawings

REACTIVE DYES, THEIR PREPARATION, AND THEIR USE

The present invention relates to novel reactive dyes, processes for their preparation, and their use.

The practice of dyeing with reactive dyes has recently led to increased requirements regarding the quality of the dyeings and the profitability of the dyeing process. There is consequently still a need for novel reactive dyes which have improved properties, in particular in respect of application.

Reactive dyes which have an adequate substantivity and at the same time a good ease of washing out of the non-fixed portions are nowadays required for dyeing. They should furthermore have a good tinctorial yield and have a high reactivity, and in particular should give dyeings with high degrees of fixing. These requirements are not met in all their properties by the known dyes.

The present invention is therefore based on the object of discovering novel improved reactive dyes for dyeing and printing fibre materials which have the qualities characterized above to a high degree. The novel dyes should have the distinctive features in particular of high fixing yields and high fibre-dye bond stabilities, and furthermore the portions not fixed to the fibre should be easy to wash out. They should furthermore produce dyeings with good allround fastness properties, for example light- and wet-fastnesses.

It has been found that the object described is largely achieved by the novel reactive dyes defined below.

The present invention relates to compounds of the formula $$Z-N=N-\overset{HO}{\underset{HO_3S}{\text{(naphthalene)}}}-\overset{B_1}{\underset{B_2}{}}-N=N-K \qquad (1)$$

in which
- one of the radicals $B_1$ and $B_2$ is hydrogen and the other is sulfo,
- K is the radical of a coupling component of the naphthyl series or of the heterocyclic series and
- Z is the radical of a diazo component, which is free from hydroxyl groups, of the benzene or naphthalene series or the radical of a monoazo compound, and in which at least one of the radicals K or Z contains a fibre-reactive group selected from the group consisting of $$-SO_2-Y, \qquad (2a)$$

$$-CONR_1-(CH_2)_n-SO_2-Y \text{ and} \qquad (2b)$$

$$-NR_1-\underset{N}{\overset{X}{\underset{\|}{\text{(triazine)}}}}-T \qquad (2c)$$

in which
- X is halogen, 3-carboxypyridin-1-yl or 3-carbamoylpyridin-1-yl,
- T independently is as defined for X or is hydroxyl, $C_1$–$C_4$alkoxy, phenoxy, $C_1$–$C_4$alkylthio, morpholino, amino which is unsubstituted or substituted by non-reactive radicals, or a reactive radical of the formula $$-N(R_2)-alk-SO_2-Y, \qquad (3a)$$

$$-N(R_1)-alk-Q-alk'-SO_2-Y, \qquad (3b)$$

$$-N(R_1)-arylene-SO_2-Y, \qquad (3c)$$

$$-N(R_1)-arylene-(alk)_m-W-alk'-SO_2-Y, \qquad (3d)$$

$$-N\underset{\underset{}{\smile}}{\overset{\frown}{\phantom{X}}}N-alk-SO_2-Y \qquad (3e)$$

or $$-N(R_1)-arylene-NH-CO-Y_1, \qquad (3f)$$

$R_2$ is hydrogen, $C_1$–$C_4$alkyl which is unsubstituted or substituted by hydroxyl, sulfo, sulfato, carboxyl or cyano, or a radical $$-alk-SO_2-Y,$$

$R_3$ is hydrogen, hydroxyl, sulfo, sulfato, carboxyl, cyano, halogen, $C_1$–$C_4$alkoxycarbonyl, $C_1$–$C_4$alkanoyloxy, carbamoyl or the group —$SO_2$—Y, alk and alk' independently of one another are $C_1$–$C_6$alkylene, arylene is a phenylene or naphthylene radical which is unsubstituted or substituted by sulfo, carboxyl, $C_1$–$C_4$alkyl, $C_1$–$C_4$alkoxy or halogen, $Y_1$ is a group —$CHX_2$—$CH_2X_2$ or —$CX_2$=$CH_2$ and $X_2$ is chlorine or bromine, Q is the radical —O— or —$NR_1$—, W is a group —$SO_2$—$NR2$—, —$CONR_2$—or —$NR_2CO$—, m is the number 0 or 1, $R_1$ is hydrogen or $C_1$–$C_4$alkyl, Y is vinyl or a radical —$CH_2$—$CH_2$—U and U is a leaving group which can be split off under alkaline conditions, and n is an integer from 1 to 6.

The compounds of the formula (1) contain at least two sulfo groups, each of which can be present either in the form of the free acid —$SO_3^H$ or in any salt form, for example in the form of an alkali metal, alkaline earth metal or ammonium salt or in the form of a salt of an organic amine. Examples are the sodium, potassium, lithium or ammonium salt, the salt of mono-, di- or triethanolamine or any Na/Li or Na/Li/NH$_4$ mixed salts.

$C_1$–$C_4$alkyl is generally methyl, ethyl, n- or iso-propyl or n-, iso-, sec- or tert-butyl. $C_1$–$C_4$alkoxy is generally methoxy, ethoxy, n- or iso-propoxy or n-, iso-, sec- or tert-butoxy and, preferably, methoxy or ethoxy. Halogen is generally, for example, bromine or chlorine. Examples of $C_2$–$C_4$alkanoyloxy are acetyl or propionyl, and examples of $C_1$–$C_4$alkoxy are methoxycarbonyl or ethoxycarbonyl. $C_1$–$C_6$alkylene is generally to be understood as meaning $C_1$–$C_6$alkylene which is straight-chain or branched in any way; examples are methylene, 1,1- or 1,2-ethylene, 1,2- or 1,3-propylene, 1,2-, 1,3-, 1,4- or 2,3-butylene, 1,4-, 2,3- or 2,4-pentylene, 2-methyl-1,5-pentylene and 1,6-hexylene, where these radicals can be substituted as defined or, with the exception of methylene, interrupted by a heteroatom —O— or —$NR_1$—.

Fibre-reactive groups are to be understood as meaning those which are capable of reacting with hydroxyl groups of cellulose, the amino, carboxyl, hydroxyl and thiol groups of wool and silk or the amino and, possibly, any carboxyl groups of synthetic polyamides to form covalent chemical bonds. The fibre-reactive groups of the formulae (2a), (2b) and (2c) are as a rule bonded to the dye radical directly or via a bridge member.

Suitable leaving groups U which can be split off under alkaline conditions are, for example, halogen, for example chlorine or bromine, acyloxy, for example acetoxy or benzoyloxy, phosphato, sulfato or thiosulfato.

Examples of suitable radicals Y are accordingly vinyl, β-bromo- or β-chloroethyl, β-acetoxyethyl, β-benzoyloxyethyl, β-phosphatoethyl, β-sulfatoethyl and β-thiosulfatoethyl. Y is preferably vinyl or β-sulfatoethyl.

$R_1$ is preferably hydrogen, methyl or ethyl, and particularly preferably hydrogen.

n is preferably the number 2 or 3, and particularly preferably the number 2. m is preferably the number 0.

An amino radical T which is unsubstituted or substituted by non-reactive radicals can be, for example, amino, N—$C_1$–$C_4$alkylamino or N,N-di-$C_1$–$C_4$alkylamino, where the alkyl is unsubstituted or substituted, for example by sulfo, sulfato, hydroxyl, carboxyl or phenyl, cyclohexylamino, N—$C_1$–$C_4$alkyl-N-phenylamino or phenylamino or naphthylamino, where the phenyl or naphthyl is unsubstituted or substituted, for example by $C_1$–$C_4$alkyl, $C_1$–$C_4$alkoxy, $C_2$–$C_4$alkanoylamino, carboxyl, sulfo or halogen.

Examples of suitable non-reactive amino radicals T are amino, methylamino, ethylamino, β-hydroxyethylamino, N,N-di-β-hydroxyethylamino, β-sulfoethylamino, N-methyl-N-β-sulfoethylamino, N-methyl-N-β-hydroxyethylamino, cyclohexylamino, morpholino, o-, m- or p-chlorophenylamino, o-, m- or p-methylphenylamino, o-, m- or p-methoxyphenylamino, o-, m- or p-sulfophenylamino, disulfophenylamino, o-carboxyphenylamino, 1- or 2-naphthylamino, 1-sulfo-2-naphthylamino, 4,8-disulfo-2-naphthylamino, N-ethyl-N-phenylamino, N-methyl-N-phenylamino, methoxy, ethoxy, n- or iso-propoxy and hydroxyl.

A non-reactive radical T is preferably $C_1$–$C_4$alkoxy, hydroxyl, amino, N-mono- or N,N-di-$C_1$–$C_4$-alkylamino, in which the alkyl is unsubstituted or substituted by hydroxyl, sulfato or sulfo, morpholine, phenylamino or N—$C_1$–$C_4$alkyl-N-phenylamino, in which the phenyl is in each case unsubstituted or substituted by sulfo, carboxyl, acetylamino, methyl or methoxy.

A non-reactive radical T is particularly preferably amino, N-mono- or N,N-di-$C_1$–$C_4$alkylamino, in which the alkyl is unsubstituted or substituted by hydroxyl, sulfato or sulfo, morpholino, phenylamino or N—$C_1$–$C_4$alkyl-N-phenylamino, in which the phenyl is in each case unsubstituted or substituted by sulfo, carboxyl, acetylamino, methyl or methoxy.

Particularly preferred non-reactive radicals T are amino, N-methylamino, N-ethylamino, N-β-sulfoethylamino, N-methyl-N-β-sulfoethylamino, N-methyl-N-β-hydroxyethylamino, morpholino, phenylamino, 2-, 3- or 4-sulfophenylamino or N—$C_1$–$C_4$alkyl-N-phenylamino.

X is preferably halogen, for example fluorine, chlorine or bromine, and particularly preferably chlorine or fluorine. $X_2$ is preferably bromine.

alk and alk' independently of one another are, for example, a methylene, ethylene, 1,3-propylene, 1,4-butylene, 1,5-pentylene or 1,6-hexylene radical or branched isomers thereof.

alk and alk' preferably independently of one another are each a $C_1$–$C_4$alkylene radical, and particularly preferably an ethylene radical or propylene radical.

arylene is preferably a 1,3- or 1,4-phenylene radical which is unsubstituted or substituted, for example by sulfo, methyl, methoxy or carboxyl, and particularly preferably an unsubstituted 1,3- or 1,4-phenylene radical.

$R_2$ is preferably hydrogen or $C_1$–$C_4$alkyl, particularly preferably hydrogen, methyl or ethyl, and especially preferably hydrogen.

$R_3$ is preferably hydrogen.

Q is preferably —NH— or —O—, and particularly preferably —O—.

W is preferably a group of the formula —CONH— or —NHCO—, in particular a group of the formula —CONH—.

β-phosphatoethyl, p-sulfatoethyl or β-thiosulfatoethyl, $R_1$ is hydrogen, methyl or ethyl, n is the number 2 or 3, X is halogen and T is $C_1$–$C_4$alkoxy, hydroxy, amino, N-mono- or N,N-di-$C_1$–$C_4$-alkylamino, in which the alkyl is unsubstituted or substituted by hydroxyl, sulfato or sulfo, morpholino, phenylamino or N—$C_1$–$C_4$alkyl-N-phenylamino, in which the alkyl is unsubstituted or substituted by hydroxyl, sulfo or sulfato and the phenyl is in each case unsubstituted or substituted by sulfo, carboxyl, acetylamino, methyl or methoxy, or a fibre-reactive radical of the formula

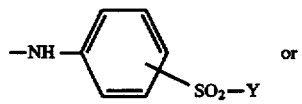

(3c')

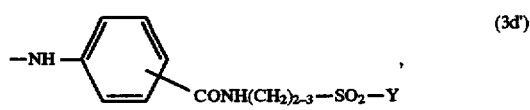

(3d')

in which

Y is as defined above.

The radicals K and Z can contain one or more identical or different fibre-reactive groups.

K is, for example, the radical of a coupling component of the naphthalene, phenylazonaphthalene, 4-alkyl-6-hydroxypyrid-2-one, 2,5-diamino-4-alkylpyridine, 1-arylpyrazol-5-one or 1-aryl-5-aminopyrazole series, where this component can contain substituents customary in dyes and, if appropriate, one or more fibre-reactive groups.

Examples from the series of substituents are: alkyl groups having 1 to 12 carbon atoms, in particular 1 to 4 carbon atoms, such as methyl, ethyl, n- or iso-propyl or n-, iso-, sec- or tert-butyl, alkoxy groups having 1 to 8 carbon atoms, in particular 1 to 4 carbon atoms, such as methoxy, ethoxy, n- or iso-propoxy or n-, iso-, sec- or tert-butoxy, $C_1$–$C_4$alkoxy which is substituted in the alkyl part, for example by hydroxyl, $C_1$–$C_4$alkoxy or sulfato, for example 2-hydroxyethoxy, 3-hydroxypropoxy, 2-sulfatoethoxy, 2-methoxyethoxy or 2-ethoxyethoxy, acylamino groups having 2 to 8 carbon atoms, in particular $C_2$–$C_4$alkanoylamino groups, such as acetylamino or propionylamino, benzoylamino or $C_2$–$C_4$alkoxycarbonylamino groups, such as methoxycarbonylamino or Preferred reactive radicals of the formulae (3a) to (3f) are those in which W is a group of the formula —CONH— or —NHCO—, $R_1$, $R_2$ and $R_3$ are each hydrogen, Q is the radical —O— or —NH—, alk and alk' independently of one another are each ethylene or propylene, arylene is phenyl which is unsubstituted or substituted by methyl, methoxy, carboxyl or sulfo, Y is vinyl or β-sulfatoethyl, $Y_1$ is —CHBr—$CH_2$Br or —CBr=$CH_2$ and m is the number 0.

If Z contains a fibre-reactive group, this preferably has the formula (2a), (2b) or (2c) defined above, in which Y is vinyl, β-bromo- or β-chloroethyl, β-acetoxyethyl, β-benzoyloxyethyl, β-phosphatoethyl, β-sulfatoethyl or β-thiosulfatoethyl, $R_1$ is hydrogen, methyl or ethyl, n is the number 2 or 3, X is halogen and T is $C_1$–$C_4$alkoxy, hydroxyl, amino, N-mono- or N,N-di-$C_1$–$C_4$alkylamino, in which the alkyl is unsubstituted or substituted by hydroxyl, sulfato or sulfo, morpholino, phenylamino or N—$C_1$–$C_4$alkyl-N-phenylamino, in which the alkyl is unsubstituted or substituted by hydroxyl, sulfo or sulfato and the phenyl is in each case unsubstituted or substituted by sulfo, carboxyl, acetylamino, methyl or methoxy.

A reactive radical contained in Z particularly preferably has the formula (2a) or (2c) defined above, in which Y is vinyl or β-sulfatoethyl, $R_1$ is hydrogen, X is chlorine or fluorine and T is amino, N-mono- or N,N-di-$C_1$–$C_4$alkylamino, in which the alkyl is unsubstituted or substituted by hydroxyl, sulfato or sulfo, morpholino, phenylamino or N—$C_1$–$C_4$alkyl-N-phenylamino, in which the phenyl is in each case unsubstituted or substituted by sulfo, carboxyl, acetylamino, methyl or methoxy.

If the radical K contains a reactive radical, this is preferably a radical of the formula (2a), (2b) or (2c) defined above, in which Y is vinyl, β-bromo- or β-chloroethyl, β-acetoxyethyl, β-benzoyloxyethyl, ethoxycarbonylamino, amino, N-mono- or N,N-di-$C_1$–$C_4$alkylamino which is unsubstituted or substituted in the alkyl part, for example by hydroxyl, sulfo, sulfato or $C_1$–$C_4$alkoxy, for example methylamino, ethylamino, N,N-dimethyl or N,N-diethylamino, sulfomethylamino, p-hydroxyethylamino, N,N-di-(2-hydroxy ethylamino) or N-β-sulfatoethylamino, phenylamino which is unsubstituted or substituted in the phenyl part by methyl, methoxy, halogen or sulfo, N—$C_1$–$C_4$alkyl-N-phenylamino which is unsubstituted or substituted in the alkyl part by hydroxyl, sulfo or sulfato or unsubstituted or substituted in the phenyl part by methyl, methoxy, halogen or sulfo, for example N-methyl-N-phenylamino, N-ethyl-N-phenylamino, N-β-hydroxyethyl-N-phenylamino or N-β-sulfoethyl-N-phenylamino, naphthylamino which is unsubstituted or substituted by sulfo, alkanoyl groups having 2 to 8 carbon atoms, in particular 2 to 4 carbon atoms, for example acetyl or propionyl, benzoyl, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, phenyl- or naphthylsulfonyl, trifluoromethyl, nitro, cyano, hydroxyl, halogen, such as fluorine, chlorine or bromine, carbamoyl, N—$C_1$–$C_4$alkylcarbamoyl, such as N-methylcarbamoyl or N-ethylcarbamoyl, sulfamoyl, N—$C_1$–$C_4$alkylsulfamoyl such as N-methylsulfamoyl, N-ethylsulfamoyl, N-propylsulfamoyl, N-isopropylsulfamoyl or N-butylsulfamoyl, N-(β-hydroxyethyl)-sulfamoyl, N,N-di-(β-hydroxyethyl)-sulfamoyl, N-phenylsulfamoyl, ureido, carboxyl, sulfomethyl, sulfo, sulfato, a radical of the formula

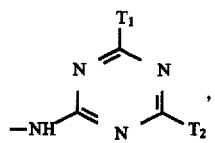 (2c')

in which $T_1$ and $T_2$ independently of one another are each hydroxyl, $C_1$–$C_4$alkoxy, morpholino or amino which is unsubstituted or substituted by non-reactive radicals, and the fibre-reactive radicals defined above. The alkyl radicals can furthermore be interrupted by oxygen (—O—) or —$NR_1$—, in which $R_1$ is as defined above.

In formula (2c'), $T_1$ and $T_2$ independently of one another are each preferably amino, N-mono- or N,N-di-$C_1$–$C_4$alkylamino, in which the alkyl is unsubstituted or substituted by hydroxyl, sulfato or sulfo, morpholino or phenylamino or N—$C_1$–$C_4$alkyl-N-phenylamino, in which the phenyl is in each case unsubstituted or substituted by sulfo, carboxyl, acetylamino, methyl or methoxy.

K is, for example, a radical of the formula

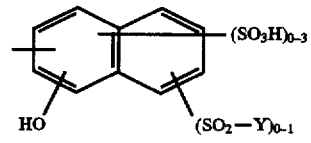 (4a)

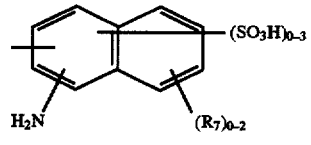 (4b)

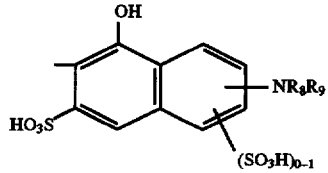 (4c)

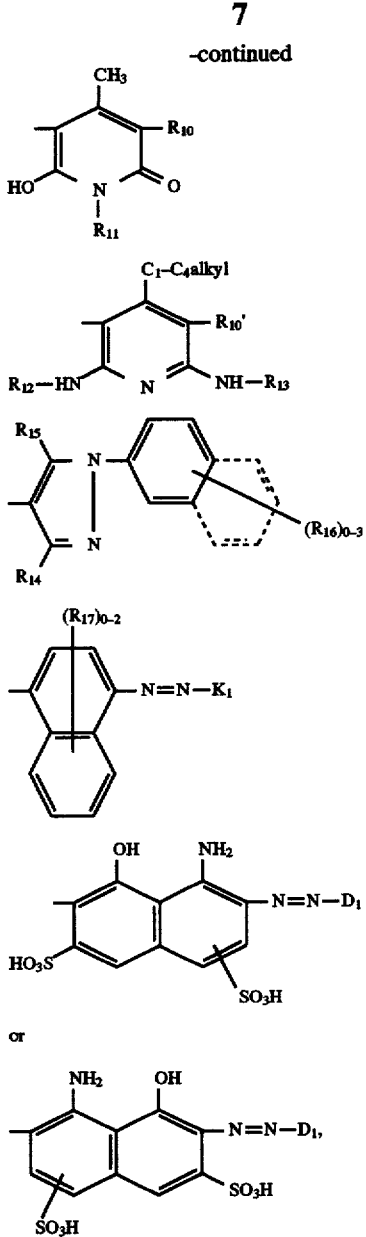

(4d)

(4e)

(4f)

(4g)

(4h)

(4i)

in which (R$_7$)$_{0-2}$ is 0 to 2 identical or different substituents R$_7$ from the group consisting of hydroxyl and a fibre-reactive radical of the formula (2a) defined above;

R$_8$ is hydrogen or C$_1$–C$_4$alkyl which is unsubstituted or substituted by hydroxyl, C$_1$–C$_4$alkoxy, sulfato, sulfo, halogen or cyano;

R$_9$ independently is as defined for R$_8$, or is C$_2$–C$_4$alkanoyl, benzoyl or a fibre-reactive radical of the formula (2c) defined above;

R$_{10}$ and R$_{10}'$ independently of one another are each carbamoyl, sulfomethyl or cyano;

R$_{11}$ is hydrogen or C$_1$–C$_4$alkyl, which is unsubstituted or substituted by a radical of the formula (2c) defined above;

R$_{12}$ and R$_{13}$ independently of one another are each hydrogen or C$_1$–C$_{12}$alkyl which is unsubstituted or substituted by hydroxyl, C$_1$–C$_4$alkoxy, phenoxy, sulfato, sulfo, carboxyl, amino or N-mono- or N,N-di-C$_1$–C$_4$alkylamino, which in turn can be substituted in the alkyl part by hydroxyl, C$_1$–C$_4$alkoxy, phenoxy, sulfato, sulfo, carboxyl or a fibre-reactive radical of the formula (2c) defined above, which C$_1$–C$_{12}$alkyl radical also or alternatively, with the exception of methyl, may be interrupted by —O—;

R$_{14}$ is methyl or carboxyl;

R$_{15}$ is hydroxyl or amino;

(R$_{16}$)$_{0-3}$ is 0 to 3 identical or different radicals R16 from the group consisting of sulfo, halogen, hydroxyl, C$_1$–C$_4$alkoxy and C$_1$–C$_4$alkyl;

(R$_{17}$)$_{0-2}$ is 0 to 2 identical or different radicals R17 from the group consisting of C$_1$–C$_4$alkyl, C$_1$–C$_4$alkoxy, C$_1$–C$_4$alkoxy which is substituted in the alkyl part by hydroxyl, C$_1$–C$_4$alkoxy or sulfato, C$_2$–C$_4$alkanoylamino, ureido, halogen and sulfo;

K$_1$ independently is a radical of the formula (4a)–(4f), (4h) or (4i) defined above, and preferably a radical of the formula (4c);

D$_1$ is a phenyl or 1- or 2-naphthyl radical which carries 1 to 3 identical or different radicals from the group consisting of sulfo, C$_1$–C$_4$alkyl, C$_1$–C$_4$alkoxy, halogen or a fibre-reactive radical of the formula (2a), (2b) or (2c);

and X and Y are each as defined above.

The following preferences apply to the variables defined in the formulae (4a) to (4i):

R$_8$ is preferably hydrogen;

R$_9$ is preferably acetyl, propionyl, benzoyl or a fibre-reactive radical of the formula (2c) defined above;

R$_{10}$ is preferably carbamoyl or sulfomethyl;

R$_{10}'$ is preferably cyano or carbamoyl;

R$_{11}$ is preferably methyl or ethyl;

R$_{12}$ is preferably hydrogen or C$_1$–C$_6$alkyl which is unsubstituted or substituted by hydroxyl, methoxy, ethoxy, sulfato or sulfo;

R$_{13}$ preferably independently is as defined for R$_{12}$ or is a radical of the formula (2c) defined above;

R$_{15}$ is preferably hydroxyl;

R$_{12}$ and R$_{13}$ independently of one another are each particularly preferably hydrogen or C$_1$–C$_6$alkyl which is unsubstituted or substituted by hydroxyl, sulfo or sulfato;

(R$_{16}$)$_{0-3}$ is preferably 0 to 3 identical or different radicals R16 from the group consisting of sulfo, methyl, methoxy, hydroxyl and chlorine;

(R17)$_{0-2}$ is preferably 0 to 2 identical or different radicals R17 from the group consisting of methyl, methoxy, C$_1$–C$_2$alkoxy which is substituted in the alkyl part by hydroxyl or sulfato, acetylamino, propionylamino and sulfo; and D$_1$ is preferably a phenyl or 1- or 2-naphthyl radical which carries 1 to 3 identical or different radicals from the group consisting of sulfo, methyl, methoxy, chlorine and a fibre-reactive radical of the formula (2a) or (2c);

K is preferably a radical of the formula

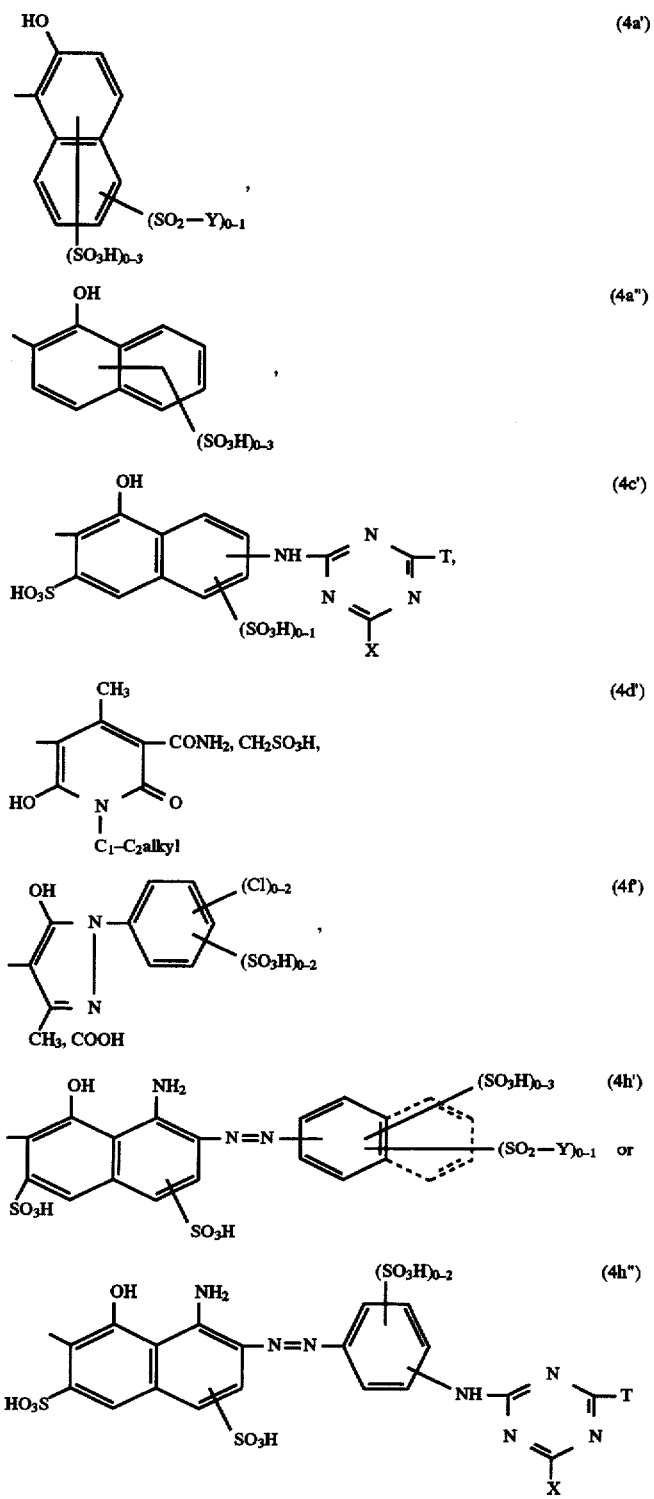

in which

X is chlorine or fluorine,

T is amino, N-mono- or N,N-di-$C_1$-$C_4$alkylamino, in which the alkyl is unsubstituted or substituted by hydroxyl, sulfato or sulfo, morpholino or phenylamino or N—$C_1$-$C_4$alkyl-N-phenylamino, in which the phenyl is in each case unsubstituted or substituted by sulfo, carboxyl, acetylamino, methyl or methoxy, and Y is as defined and preferred above.

K is particularly preferably a radical of the formula (4c'), (4h') or (4h") defined above.

Z is preferably a phenyl, naphthyl, phenylazo or naphthylazophenyl radical, which can contain one or more of the fibre-reactive groups of the formula (2a), (2b) or (2c) defined above and the substituents customary in organic dyes, such as have been defined above, for example, for K.

Examples of preferred substituents on the radical Z are $C_1$-$C_4$alkyl, $C_1$-$C_4$alkoxy, halogen, sulfo or a radical of the formula (2c') defined above, and the fibre-reactive groups defined above.

Z is particularly preferably a phenyl, naphthyl or phenylazophenyl radical which carries a fibre-reactive group of the formula (2a) and/or (2c), in which Y is vinyl or β-sulfatoethyl, $R_1$ is hydrogen, X is chlorine or fluorine and T is amino, N-mono- or N,N-di-$C_1$-$C_4$alkylamino, in which the alkyl is unsubstituted or substituted by hydroxyl, sulfato or sulfo, morpholino, phenylamino or N—$C_1$-$C_4$alkyl-N-phenylamino, in which the phenyl is in each case unsubstituted or substituted by sulfo, carboxyl, acetylamino, methyl or methoxy, and is furthermore unsubstituted or substituted by methyl, ethyl, methoxy, ethoxy, chlorine, sulfo or a radical of the formula (2c') defined above, in which $T_1$ and $T_2$ are as defined and preferred above.

Z is particularly preferably a radical of the formula

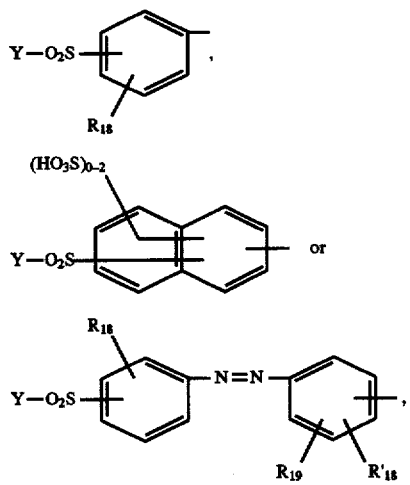

in which $R_{18}$ and $R'_{18}$ independently of one another are each hydrogen, sulfo, methyl, ethyl, methoxy, ethoxy or chlorine, $R_{19}$ is hydrogen, sulfo or a radical of the formula (2c) or (2c') defined above, in which $R_1$, X, T, $T_1$ and $T_2$ are as defined and preferred above, and Y is as defined and preferred above.

A preferred embodiment of the present invention comprises compounds of the formula

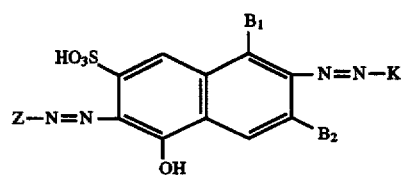

in which one of the radicals $B_1$ and $B_2$ is hydrogen and the other is sulfo and the variables K and Z are as defined and preferred above.

Particularly preferred compounds of the formula (1a) here are those in which $B_1$ is sulfo and $B_2$ is hydrogen.

Another preferred embodiment of the present invention comprises compounds of the formula

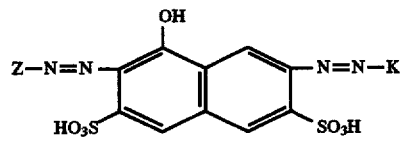

in which the variables K and Z are as defined and preferred above.

The compounds of the formula (1) or (1a) or (1b) can be obtained, for example, by diazotizing about 1 molar equivalent of a compound of the formula $$Z-NH_2 \qquad (6)$$

in the customary manner, for example with nitrites, such as sodium nitrite, in an acid, for example hydrochloric acid, medium, coupling the diazotization product to about 1 molar equivalent of a compound of the formula

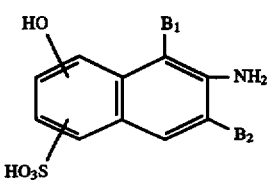

and diazotizing the resulting monoazo compound again in the customary manner and coupling the diazotization product to a compound of the formula $$K-H \qquad (8)$$

in which

Z, $B_1$, $B_2$ and K in each case are as defined above.

The two abovementioned coupling reactions are carried out, for example, at a neutral to slightly acid pH, for example at pH 3 to 7, and temperatures from −5° to 30° C.

The compounds of the formulae (6) to (8) are known or can be obtained in a manner known per se.

The compounds of the formula (1) are suitable as reactive dyes for dyeing and printing widely varying materials, such as silk, leather, wool, polyamide fibres and polyurethanes, and in particular all types of cellulosic fibre materials. Such fibre materials are, for example, the naturally occurring cellulose fibres, such as cotton, linen and hemp, as well as cellulose and regenerated cellulose. The reactive dyes of the formula (1) are also suitable for dyeing or printing fibres containing hydroxyl groups contained in blend fabrics, for example mixtures of cotton with polyester fibres or polyamide fibres.

The dyes according to the invention can be applied to the fibre material and fixed on the fibre in various ways, in particular in the form of aqueous dye solutions and printing pastes. They are suitable both for the exhaust method and for dyeing by the padding method, can be employed at low dyeing temperatures and require only short steaming times in the pad-steam method. The degrees of fixing are high and the non-fixed portions can easily be washed out, the difference between the degree of exhaustion and the degree of fixing being remarkably small, i.e. the soaping loss is very low. The reactive dyes of the formula (1) are also suitable for printing, in particular on cotton, and likewise also for printing nitrogen-containing fibres, for example wool, silk or wool-containing blend fabrics.

The dyeings and prints produced with the dyes according to the invention on cellulosic fibre materials have a high colour strength and a high fibre-dye bond stability, both in the acid and in the alkaline range, and furthermore a good light-fastness and very good wet-fastness properties, such as fastnesses to washing, water, sea water, crossdyeing and perspiration, as well as a good fastness to pleating, fastness to ironing, fastness to rubbing and, in particular, fastness to chlorine.

The following examples serve to illustrate the invention. The temperatures are stated in degrees Celsius, parts are parts by weight and the percentage data are percentages by weight, unless stated otherwise. Parts by weight bear the same relation to parts by volume as the kilogram to the litre.

EXAMPLE 1

28 parts of 2-(4-aminophenylsulfonyl)-ethyl hydrogen sulfate are introduced into 150 parts of water and the mixture is stirred thoroughly. 16 parts of concentrated hydrochloric acid are added to this suspension, the mixture is cooled to 0° to 5° C. and 7 parts of sodium nitrite, dissolved in 25 parts of water, are slowly added dropwise. When the diazotization has taken place, the excess nitrite is destroyed with sulfamic acid.

The diazo solution prepared in this way is then added to a solution of 32 parts of 6-amino-1-hydroxynaphthalene-3, 5-disulfonic acid in 150 parts of water at 0° to 5° C., during which the pH is kept constant at pH 7 by addition of sodium hydroxide solution.

When the coupling has ended, the resulting aminoazo compound of the formula

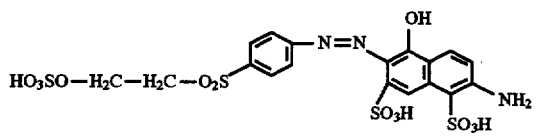

is diazotized again, without prior isolation, with 7 parts of sodium nitrite in hydrochloric acid solution at 0° to 5° C., and at the end the excess nitrite is destroyed with sulfamic acid (diazo solution 1).

EXAMPLES 2–3

The procedure described in Example 1 is repeated, using an equivalent mount of 6-amino-1-hydroxynaphthalene-3, 7-disulfonic acid or 7-amino-1-hydroxynaphthalene-3,6-disulfonic acid instead of 6-amino-1-hydroxynaphthalene-3,5-disulfonic acid. Solutions of the diazo compounds of the following amino compounds are obtained.

| Example No. | Amino compound | |
|---|---|---|
| 2 | (structure) | (diazo solution 2) |
| 3 | (structure) | (diazo solution 3) |

EXAMPLE 4

4:35 parts of 2-(2-amino-1-sulfonaphth-6-yl-sulfonyl)-ethyl hydrogen sulfate are introduced into 200 parts of water and the mixture is stirred thoroughly. 16 parts of concentrated hydrochloric acid are added to this suspension, the mixture is cooled to 0° to 5° C. and 7 parts of sodium nitrite, dissolved in 25 parts of water, are slowly added dropwise. When the diazotization has taken place, the excess nitrite is destroyed with sulfamic acid.

The diazo solution prepared in this way is then added to a solution of 32 parts of 6-amino-1-hydroxynaphthalene-3, 5-disulfonic acid in 150 parts of water at 0° to 5° C., during which the pH is kept constant at pH 7 by addition of sodium hydroxide solution.

When the coupling is complete, the resulting aminoazo compound of the formula

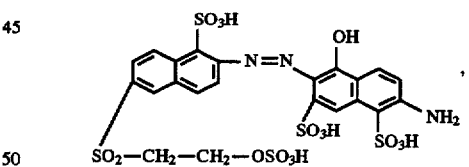

is diazotized again, without prior isolation, with 7 parts of sodium nitrite in hydrochloric acid solution at 0° to 5° C., and at the end the excess nitrite is destroyed with sulfamic acid (diazo solution 4).

EXAMPLES 5–6

The procedure described in Example 4 is repeated using an equivalent mount of 6-amino-1-hydroxynaphthalene-3, 7-disulfonic acid or 7-amino-1-hydroxynaphthalene-3,6-disulfonic acid instead of 6-amino-1-hydroxynaphthalene-3,5-disulfonic acid. Solutions of the diazo compounds of the following amino compounds are obtained.

| Example No. | Amino compound | |
|---|---|---|
| 5 | 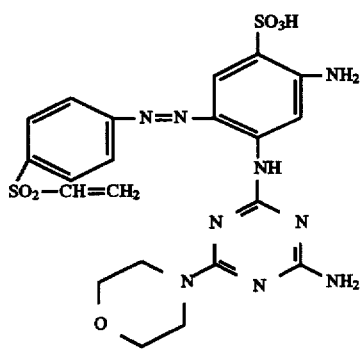 | (diazo solution 5) |
| 6 | | (diazo solution 6) |

EXAMPLE 7

63 parts of the compound of the formula (preparation in accordance with EP-A 0 647 683) are introduced into 600 parts of water and the mixture is stirred thoroughly. 16 parts of concentrated hydrochloric acid are added to this suspension, the mixture is cooled to 0° to 5° C. and 7 parts of sodium nitrite, dissolved in 25 parts of water, are slowly added dropwise. After the diazotization has taken place, the excess nitrite is destroyed with sulfamic acid.

The diazo solution prepared in this way is then added to a solution of 32 parts of 6-amino-1-hydroxynaphthalene-3, 5-disulfonic acid in 150 parts of water at 0° to 5° C., during which the pH is kept constant at pH 7 by addition of sodium hydroxide solution.

When the coupling is complete, the resulting aminoazo compound of the formula

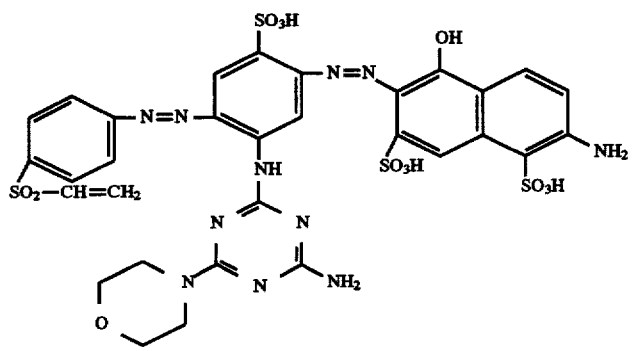

is diazotized again, without prior isolation, with 7 parts of sodium nitrite in hydrochloric acid solution at 0° to 5° C., and at the end the nitrite excess is destroyed with sulfamic acid (diazo solution 7).

EXAMPLES 8–9

The procedure described in Example 7 is repeated, using an equivalent amount of 6-amino-1-hydroxynaphthalene-3, 7-disulfonic acid or 7-amino-1-hydroxynaphthalene-3,6-disulfonic acid instead of 6-amino-1-hydroxynaphthalene-3,5-disulfonic acid. Solutions of the diazo compounds of the following amino compounds are obtained.

| Example No. | Amino compound | |
|---|---|---|
| 8 | (structure) | (diazo solution 8) |
| 9 | (structure) | (diazo solution 9) |

EXAMPLES 10–12

The diazo compounds of the following amino compounds can be prepared in a manner analogous to that described in Examples 7 to 9.

| | | |
|---|---|---|
| 10 | (structure) | (diazo solution 10) |
| 11 | (structure) | (diazo solution 11) |

12 (diazo solution 12)

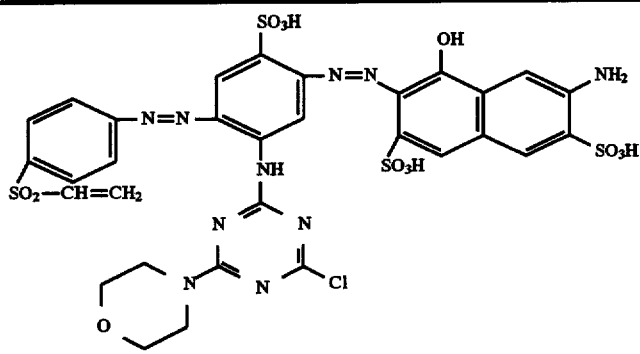

EXAMPLE 13

20 parts of 1-ethyl-4-methyl-5-carbamoyl-6-hydroxypyrid-2-one are introduced into diazo solution 1 according to Example 1 at about 5° C. Thereafter, the pH of the reaction mixture is gradually increased to 7 by addition of sodium hydroxide solution and the mixture is stirred until coupling is complete. The dye solution is freed from salt by dialysis and evaporated in vacuo. The compound which, in the form of the free acid, has the formula is obtained as a reddish powder which dyes cellulose in orange shades with good allround properties.

EXAMPLE 15

18 parts of 1,3,5-trichlorotriazine are suspended in 100 parts of an ice/water mixture and the suspension is buffered with 3 parts of disodium hydrogen phosphate. A solution of 12 parts of 2-aminoethanesulfonic acid in 25 parts of water is added dropwise at 0° to 5° C. and the pH is kept at 7 by addition of sodium hydroxide solution. When the conden-

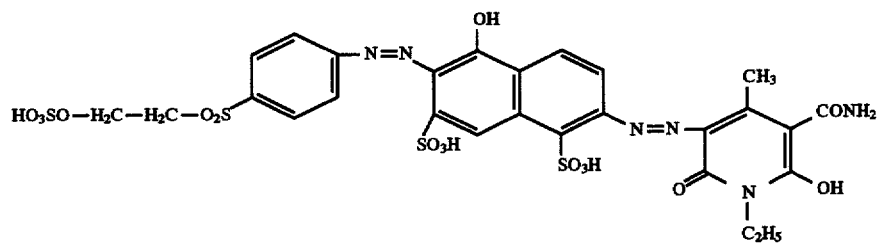

is obtained as a reddish powder which dyes cellulose in orange shades with good allround properties.

EXAMPLE 14

25 parts of 1-(3-sulfophenyl)-3-methylpyrazol-5-one are introduced into diazo solution 2 according to Example 2 at about 5° C. Thereafter, the pH of the reaction mixture is gradually increased to 7 by addition of sodium hydroxide solution and the mixture is stirred until coupling is complete. The dye solution is freed from salt by dialysis and evaporated in vacuo. The compound which, in the form of the free acid, has the formula sation has ended, 24 parts of 6-amino-1-hydroxynaphthalene-3-sulfonic acid are introduced, while keeping the pH constant at 7 with sodium hydroxide solution, and the mixture is then allowed to warm to room temperature. The bis-condensate obtained when the reaction has ended is added dropwise to diazo solution 1 according to Example 1 and the pH of the reaction mixture is gradually increased to 7 by addition of sodium hydroxide solution. The mixture is stirred until coupling is complete, and the dye solution is then freed from salt by dialysis and evaporated in vacuo. The compound which, in the form of the free acid, has the formula

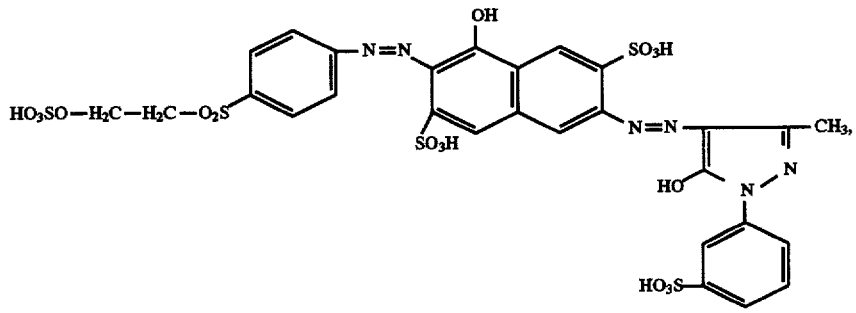

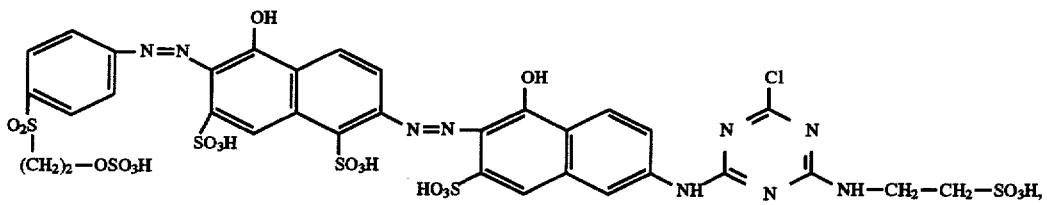

is obtained as a red powder which dyes cellulose in red shades with good allround properties.

EXAMPLE 15a

The procedure described in Example 15 is repeated, using 26 parts of 6-methylamino-1-hydroxynaphthalene-3-sulfonic acid instead of 24 parts of 6-amino-1-hydroxynaphthalene-3-sulfonic acid. The compound of the formula methylaminoethanol are then added, the pH is increased to 9 and the mixture is stirred at this pH until condensation is complete. The dye solution is freed from salt by dialysis and evaporated in vacuo. The compound which, in the form of the free acid, has the formula

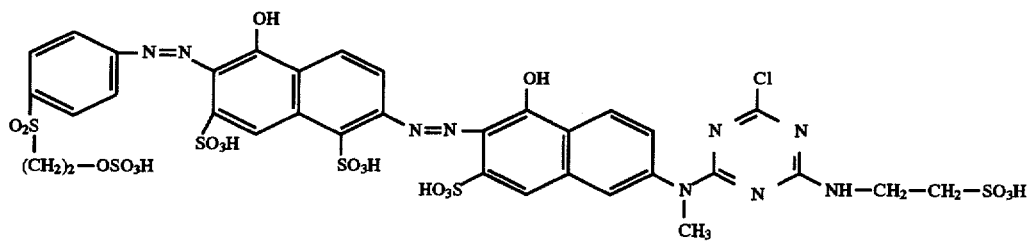

is obtained.

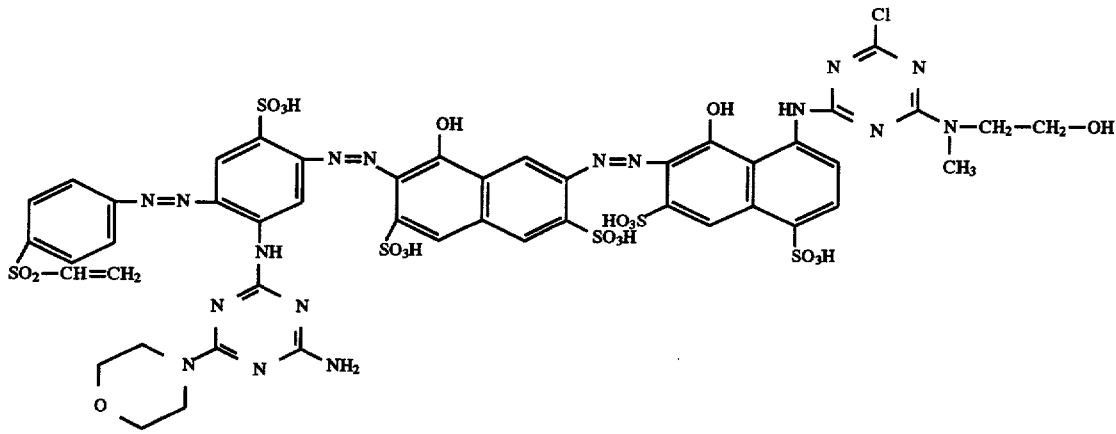

EXAMPLE 16

18 parts of 1,3,5-trichlorotriazine are suspended in 100 parts of an ice/water mixture and the suspension is buffered with 3 parts of disodium hydrogen phosphate. A solution of 24 parts of 1-amino-8-hydroxynaphthalene-4,6-disulfonic acid in 100 parts of water is added dropwise and the temperature is kept at 0° to 5° C. When the condensation has ended, diazo solution 9 according to Example 9 is added and the pH is increased to 7 by addition of sodium hydroxide solution. The mixture is allowed to warm to room temperature, while keeping the pH constant, and is stirred until the coupling has ended. 7.5 parts of 2-N- is obtained as a dark powder which dyes cellulose in navy blue shades with good allround properties.

EXAMPLES 17–19

The procedure described in Example 16 is repeated, using an equivalent amount of the diazo solutions according to Example 10, 11 or 12 instead of diazo solution 9. The compounds of the formula

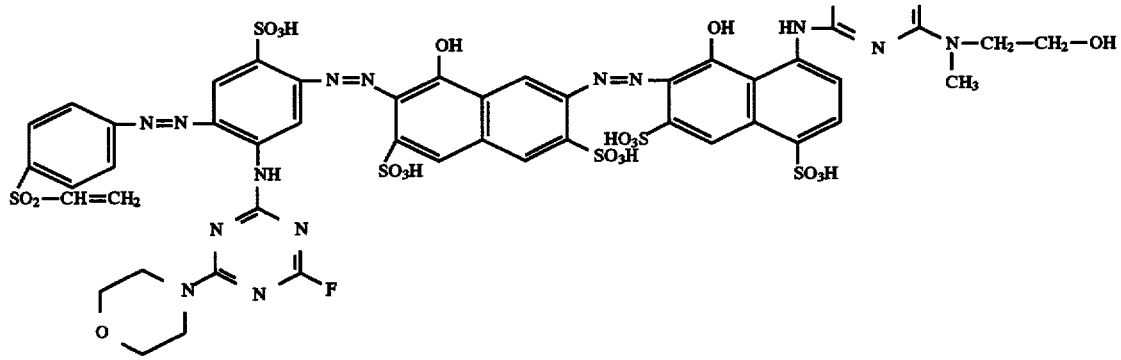
(17)

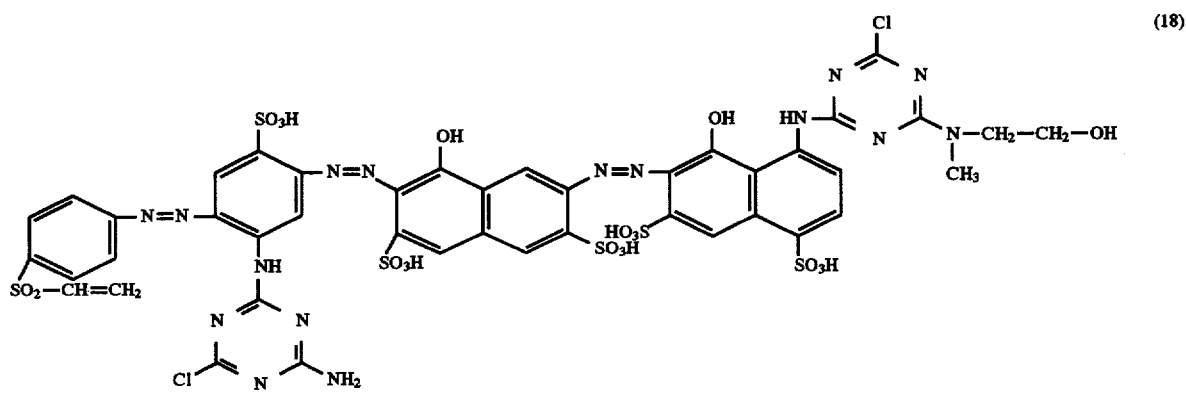
(18)

and

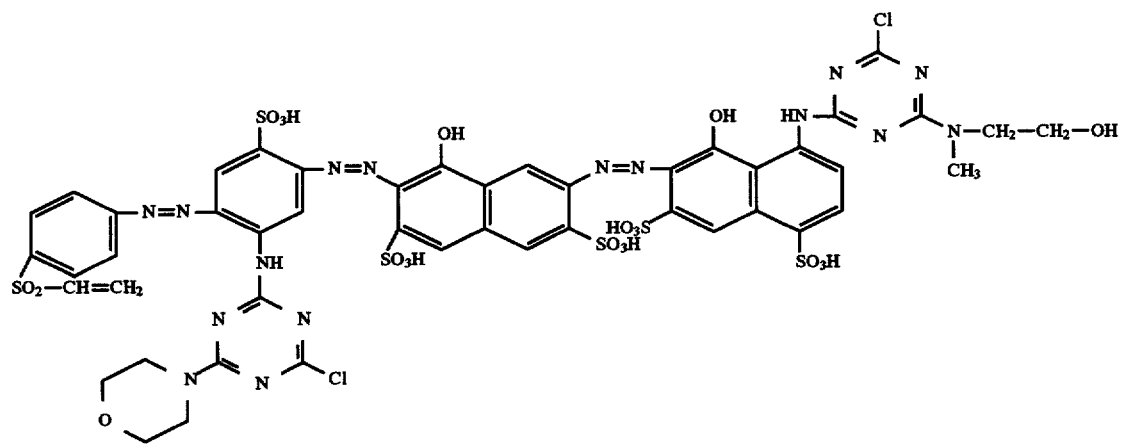
(19)

each of which dyes cellulose in navy blue shades with good allround properties, are obtained.

EXAMPLE 20

28 parts of 2-(4-aminophenylsulfonyl)-ethyl hydrogen sulfate are diazotized as described in Example 1 and the resulting diazo solution is added dropwise to a suspension of 32 parts of 1-amino-8-hydroxynaphthalene-3,6-disulfonic acid in 100 parts of water at 0° to 5° C. The mixture is allowed to warm to room temperature and is stirred until coupling is complete. Thereafter, the mixture is cooled to 5° to 10° C., the pH is increased to 3 to 4 by addition of sodium hydroxide solution and diazo solution 1 according to Example 1 is slowly added dropwise, while keeping the pH constant. When the coupling has ended, the dye solution is freed from salt by dialysis and evaporated in vacuo. The compound which, in the form of the free acid, has the formula

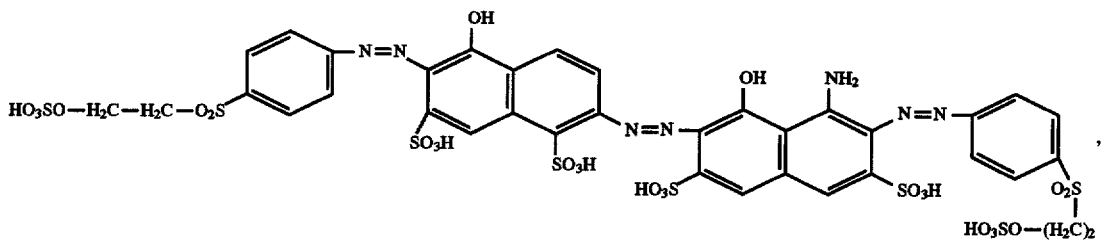

is obtained as a dark powder which dyes cellulose in navy blue shades with good allround properties.

EXAMPLE 21

28 parts of 2-(4-aminophenylsulfonyl)-ethyl hydrogen sulfate are diazotized as described in Example 1 and the resulting diazo solution is added dropwise to a suspension of 32 parts of 1-amino-8-hydroxynaphthalene-3,6-disulfonic acid in 100 parts of water at 0° to 5° C. The mixture is allowed to warm to room temperature and is stirred until coupling is complete. Thereafter, the mixture is cooled to 5° to 10° C., the pH is increased to 3 to 4 by addition of sodium hydroxide solution and diazo solution 3 according to Example 3 is slowly added dropwise, while keeping the pH constant. When the coupling has ended, the dye solution is freed from salt by dialysis and evaporated in vacuo. The compound which, in the form of the free acid, has the formula When the condensation has ended, 16 parts of concentrated hydrochloric acid are added, the mixture is cooled to 0° to 5° C. and 7 parts of sodium nitrite, dissolved in 25 parts of water, are slowly added dropwise. At the end of the diazotization the excess nitrite is destroyed with sulfamic acid. A suspension of 32 parts of 1-amino-8-hydroxynaphthalene-3,6-disulfonic acid in 100 parts of water is added dropwise to the resulting diazo solution at 0° to 5° C., 14 parts of 2-N-methylaminoethanesulfonic acid are added and the pH is increased slowly to 6.5. When the reactions have ended, diazo solution 6 according to Example 6 is added dropwise and the pH is kept constant at 6.5. When the coupling has ended, the dye solution is freed from salt by dialysis and evaporated in vacuo. The compound which, in the form of the free acid, has the formula

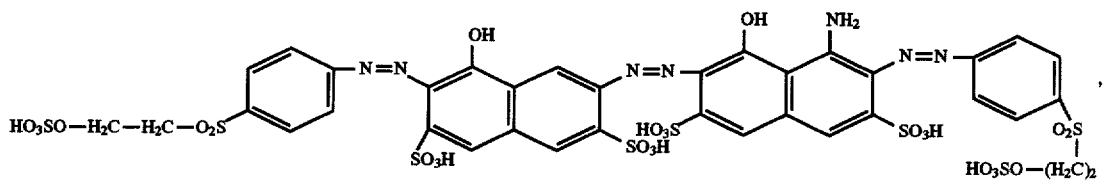

is obtained as a dark powder which dyes cellulose in navy blue shades with good allround properties.

EXAMPLE 22

18 parts of 1,3,5-trichlorotriazine are suspended in 100 parts of an ice/water mixture and the suspension is buffered

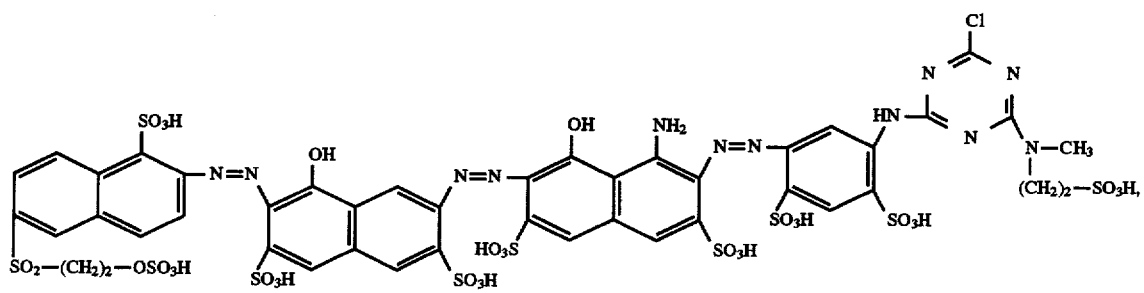

with 3 parts of disodium hydrogen phosphate. A solution, neutralized with sodium hydroxide solution, of 27 parts of 4,6-diaminobenzene-1,3-disulfonic acid in 100 parts of water is added dropwise and a pH of 4.5 is established and kept constant by addition of sodium hydroxide solution.

is obtained as a dark powder which dyes cellulose in olive shades with good allround properties.

Dyeing Instructions I 2 parts of the dye obtained according to Example 10 are dissolved in 400 parts of water; 1500 parts of a solution comprising 53 g of sodium chloride per litre are added. 100 parts of cotton fabric are introduced into this dyebath at 40° C. After 45 minutes, 100 parts of a solution comprising 16 g of sodium hydroxide and 20 g of calcined sodium carbonate per litre are added. The temperature of the dyebath is kept at 40° C. for a further 45 minutes. Thereafter, the dyed goods are rinsed, soaped at the boil with a nonionic detergent for a quarter of an hour, rinsed again and dried.

Dyeing Instructions II 2 parts of the reactive dye obtained according to Example 11 are dissolved in 400 parts of water;, 1500 parts of a solution comprising 53 g of sodium chloride per litre are added. 100 parts of a cotton fabric are introduced into this dyebath at 35° C. After 20 minutes, 100 parts of a solution comprising 16 g of sodium hydroxide and 20 g of calcined sodium carbonate per litre are added. The temperature of the dyebath is kept at 35° C. for a further 15 minutes. Thereafter, the temperature is increased to 60° C. in the course of 20 minutes. The temperature is kept at 60° C. for a further 35 minutes. Thereafter, the goods are rinsed, soaped at the boil with a nonionic detergent for a quarter of an hour, rinsed again and dried.

Dyeing Instructions III 8 parts of the reactive dye obtained according to Example 12 are dissolved in 400 parts of water; 1400 parts of a solution comprising 100 g of sodium sulfate per litre are added. 100 parts of a cotton fabric are introduced into this dyebath at 25° C. After 10 minutes, 200 parts of a solution comprising 150 g of trisodium phosphate per litre are added. Thereafter, the temperature of the dyebath is increased to 60° C. in the course of 10 minutes. The temperature is kept at 60° C. for a further 90 minutes. Thereafter, the goods are rinsed, soaped at the boil with a nonionic detergent for a quarter of an hour, rinsed again and dried.

Dyeing Instructions IV 4 parts of the reactive dye obtained according to Example 13 are dissolved in 50 parts of water. 50 parts of a solution comprising 5 g of sodium hydroxide and 20 g of calcined sodium carbonate per litre are added. A cotton fabric is padded with the resulting solution such that it increases by 70% of its weight, and is then wound onto a roll. The cotton fabric is kept in this manner at room temperature for 3 hours. Thereafter, the dyed goods are rinsed, soaped at the boil with a nonionic detergent for a quarter of an hour, rinsed again and dried.

Dyeing Instructions V 6 parts of the reactive dye obtained according to Example 14 are dissolved in 50 parts of water. 50 parts of a solution comprising 16 g of sodium hydroxide and 0.04 litre of water-glass (38°bé) per litre are added. A cotton fabric is padded with the resulting solution such that it increases by 70 % of its weight and is then wound onto a roll. The cotton fabric is kept in this manner at room temperature for 10 hours. Thereafter, the dyed goods are rinsed, soaped at the boil with a nonionic detergent for a quarter of an hour, rinsed again and dried.

Dyeing Instructions VI 2 parts of the reactive dye obtained according to Example 13 are dissolved in 100 parts of water with the addition of 0.5 part of sodium m-nitrobenzenesulfonate. A cotton fabric is impregnated with the resulting solution such that it increases by 75% of its weight and is then dried. The fabric is then impregnated with a solution, warmed to 20° C., comprising 4 g of sodium hydroxide and 300 g of sodium chloride per litre and squeezed off to a weight increase of 75%, and the dyeing is steamed at 100° to 102° C. for 30 seconds, rinsed, soaped in a 0.3% boiling solution of a nonionic detergent for a quarter of an hour, rinsed and dried.

Printing Instructions I 3 parts of the reactive dye obtained according to Example 15 are sprinkled into 100 parts of a stock thickener comprising 50 parts of 5 % sodium alginate thickener, 27.8 parts of water, 20 parts of urea, 1 part of sodium m-nitrobenzenesulfonate and 1.2 parts of sodium bicarbonate, while stirring rapidly. A cotton fabric is printed with the printing paste thus obtained and dried, and the resulting printed material is steamed in saturated steam at 102° C. for 2 minutes. The printed fabric is then rinsed, if appropriate soaped at the boil and rinsed again, and then dried.

Printing Instructions II 5 parts of the reactive dye obtained according to Example 16 are sprinkled into 100 parts of a stock thickener comprising 50 parts of 5 % sodium alginate thickener, 36.5 parts of water, 10 parts of urea, 1 part of sodium m-nitrobenzenesulfonate and 2.5 parts of sodium bicarbonate, while stirring rapidly. A cotton fabric is printed with the printing paste thus obtained, the stability of which meets industrial requirements, and dried and the resulting printed material is steamed in saturated steam at 102° C. for 8 minutes. The printed fabric is then rinsed, if appropriate soaped at the boil and rinsed again, and then dried.

What is claimed is:

1. A compound of the formula

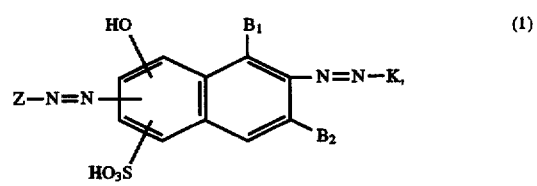

in which one of the radicals $B_1$ and $B_2$ is hydrogen and the other is sulfo, K is the radical of a coupling component of the naphthalene, phenylazonaphthalene, 4-alkyl-6-hydroxypyrid-2-one, 2,5-diamino-4-alkylpyridine, 1-arylpyrazol-5-one or 1-aryl-5-aminopyrazole series and Z is the radical of a diazo component which is free from hydroxyl groups, of the benzene or naphthalene series, and in which at least one of the radicals K or Z contains a fibre-reactive group selected from the group consisting of

 (2a),

 (2b) and

 (2c)

in which

X is halogen, 3-carboxypyridin-1-yl or 3-carbamoylpyridin-1-yl,

T independently is as defined for X or is hydroxyl, $C_1$–$C_4$alkoxy, phenoxy, $C_1$–$C_4$alkylthio, morpholino, amino which is unsubstituted or substituted by non-reactive radicals, or a reactive radical of the formula $$-\underset{\underset{R_2}{|}}{\overset{\overset{R_3}{|}}{N}}-alk-SO_2-Y, \quad (3a)$$

$$-\underset{\underset{R_1}{|}}{N}-alk-Q-alk'-SO_2-Y, \quad (3b)$$

$$-\underset{\underset{R_1}{|}}{N}-arylene-SO_2-Y, \quad (3c)$$

$$-\underset{\underset{R_1}{|}}{N}-arylene-(alk_m)-W-alk'-SO_2-Y, \quad (3d)$$

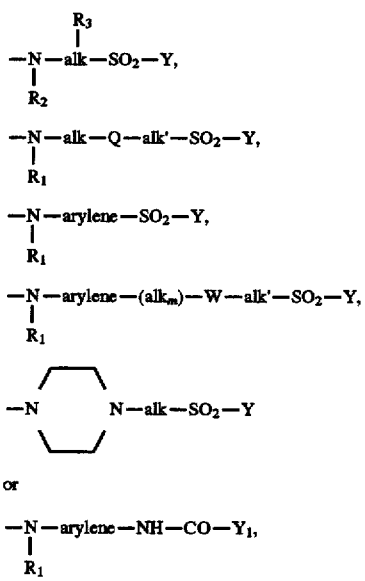

or $$-\underset{\underset{R_1}{|}}{N}-arylene-NH-CO-Y_1, \quad (3f)$$

$R_2$ is hydrogen, C1–C4alkyl which is unsubstituted or substituted by hydroxyl, sulfo, sulfato, carboxyl or cyano, or a radical

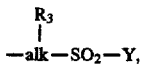

which is unsubstituted or substituted by hydroxyl, sulfo, sulfato, carboxyl or cyano, or a radical —alk—SO$_2$—Y'

$R_3$ is hydrogen, hydroxyl, sulfo, sulfato, carboxyl, cyano, halogen, $C_1$–$C_4$alkoxycarbonyl, $C_1$–$C_4$alkanoyloxy, carbamoyl or the group —SO$_2$—Y, alk and alk' independently of one another are $C_1$–$C_6$alkylene, arylene is a phenylene or naphthylene radical which is unsubstituted or substituted by sulfo, carboxyl, $C_1$–$C_4$alkyl, $C_1$–$C_4$alkoxy or halogen, $Y_1$ is a group —CHX$_2$—CH$_2$X$_2$ or —CX$_2$=CH$_2$ and $X_2$ is chlorine or bromine, Q is the radical —O— or —NR$_1$—, W is a group —SO$_2$—NR$_2$—, —CONR$_2$— or —NR$_2$CO—, m is the number 0 or 1, $R_1$ is hydrogen or $C_1$–$C_4$alkyl, Y is vinyl or a radical —CH$_2$—CH$_2$—U and U is a leaving group which can be split off under alkaline conditions, and n is an integer from 1 to 6.

2. A compound according to claim 1, of the formula

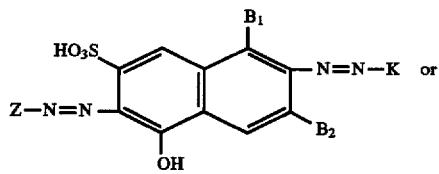

(1a)

-continued

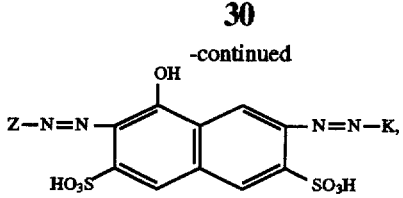

(1b)

in which one of the radicals $B_1$ and $B_2$ is hydrogen and the other is sulfo and the variables K and Z are as defined in claim 1.

3. A compound according to claim 1, in which at least one of the radicals K and Z contains a fibre-reactive group of the formula (2a), (2b) or (2c) defined in claim 1, in which Y is vinyl, β-bromo- or β-chloroethyl, βacetoxyethyl, β-benzoyloxyethyl, β-phosphatoethyl, β-sulfatoethyl or β-thiosulfatoethyl, $R_1$ is hydrogen, n is the number 2 or 3, X is halogen and T is $C_1$–$C_4$alkoxy, hydroxyl, amino, N-mono- or N,N-di-$C_1$–$C_4$alkylamino, in which the alkyl is unsubstituted or substituted by hydroxyl, sulfato or sulfo, morpholino, phenylamino or N—$C_1$–$C_4$alkyl-N-phenylamino, in which the phenyl is in each case unsubstituted or substituted by sulfo, carboxyl, acetylamino, methyl or methoxy, or a reactive radical of the formula (3a) to (3f) defined in claim 1, in which W is a group of the formula —CONH— or —NHCO—, $R_1$, $R_2$ and $R_3$ are each hydrogen, Q is the radical —O— or —NH—, alk and alk' independently of one another are each ethylene or propylene, arylene is phenylene which is unsubstituted or substituted by methyl, methoxy, carboxyl or sulfo, $Y_1$ is —CHBr—CH$_2$Br or —CBr=CH$_2$ and m is the number 0 and Y is as defined above.

4. A compound according to claim 1, in which

K contains one or more identical or different substituents selected from the group consisting of $C_1$–$C_{12}$alkyl, $C_1$–$C_8$alkoxy, $C_1$–$C_4$alkoxy which is substituted in the alkyl part by hydroxyl, $C_1$–$C_4$alkoxy or sulfato, $C_2$–$C_8$acylamino, amino, N-mono- or N,N-di-$C_1$–$C_4$-alkylamino which is unsubstituted or substituted in the alkyl part by hydroxyl, sulfo, sulfato or $C_1$–$C_4$alkoxy, phenylamino which is unsubstituted or substituted in the phenyl part by methyl, methoxy, halogen or sulfo, N—$C_1$–$C_4$alkyl-N-phenylamino which is unsubstituted or substituted in the alkyl part by hydroxyl, sulfo or sulfato or unsubstituted or substituted in the phenyl part by methyl, methoxy, halogen or sulfo, naphthylamino which is unsubstituted or substituted by sulfo, $C_2$–$C_8$alkanoyl, benzoyl, $C_1$–$C_4$alkoxy-carbonyl, $C_1$–$C_4$alkylsulfonyl, phenyl- or naphthylsulfonyl, trifluoromethyl, nitro, cyano, hydroxyl, halogen, carbamoyl, N—$C_1$–$C_4$alkylcarbamoyl, sulfamoyl, N—$C_1$–$C_4$alkyl-sulfamoyl, N-(β-hydroxyethyl)-sulfamoyl, N,N-di-(β-hydroxyethyl)-sulfamoyl, N-phenylsulfamoyl, ureido, carboxyl, sulfomethyl, sulfo, sulfato, a radical of the formula

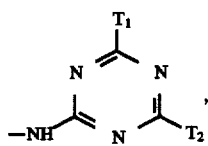 (2c')
in which
$T_1$ and $T_2$ independently of one another are each hydroxyl, $C_1$-$C_4$alkoxy, morpholino or amino which is unsubstituted or substituted by non-reactive radicals, and a fibre-reactive radical of the formula (2a), (2b) or of the formula (2c) defined in claim 1.
5. A compound according to claim 1, in which
K is a radical of the formula
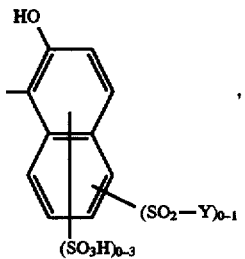 (4a')
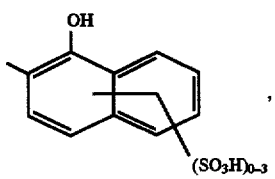 (4a")
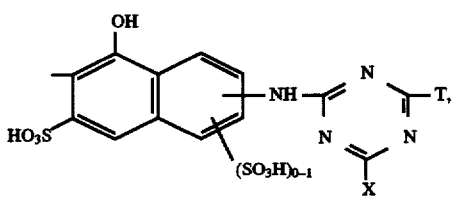 (4c')
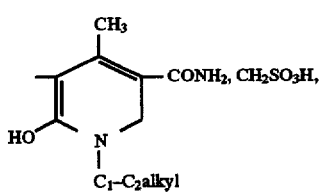 (4d')
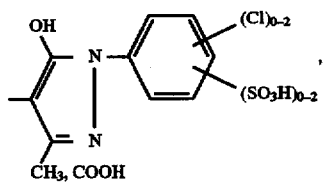 (4f')
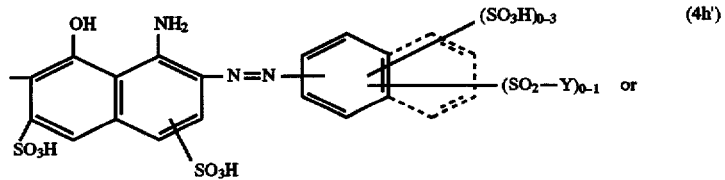 (4h')

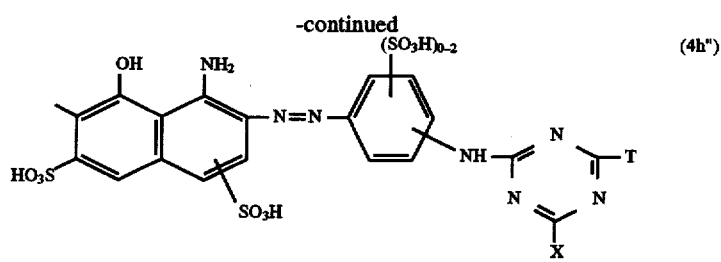

in which

X is chlorine or fluorine,

T is amino, N-mono- or N,N-di-$C_1$-$C_4$alkylamino, in which the alkyl is unsubstituted or substituted by hydroxyl, sulfato or sulfo, morpholino or phenylamino or N—$C_1$-$C_4$alkyl-N-phenylamino, in which the phenyl is in each case unsubstituted or substituted by sulfo, carboxyl, acetylamino, methyl or methoxy, and Y is as defined in claim 1.

6. A compound according to claim 5 in which

K is a radical of the formula (4c'), (4h') or (4h").

7. A compound according to claim 1, in which

Z is a phenyl or naphthyl radical which carries a fibre-reactive group of the formula (2a) and/or (2c) as defined in claim 1, in which Y is vinyl or β-sulfatoethyl, $R_1$ is hydrogen, X is chlorine or fluorine and T is amino, N-mono- or N,N-di-$C_1$-$C_4$alkylamino, in which the alkyl is unsubstituted or substituted by hydroxyl, sulfato or sulfo, morpholino, phenylamino or N—$C_1$-$C_4$alkyl-N-phenylamino, in which the phenyl is in each case unsubstituted or substituted by sulfo, carboxyl, acetylamino, methyl or methoxy, and is furthermore unsubstituted or substituted by methyl, ethyl, methoxy, ethoxy, chlorine or sulfo.

8. A compound according to claim 1, in which

Z is a radical of the formula

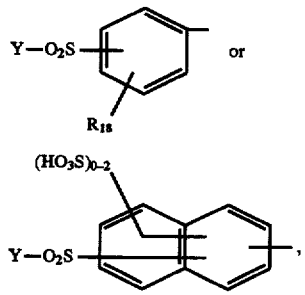

in which $R_{18}$ is hydrogen, sulfo, methyl, ethyl, methoxy, ethoxy or chlorine, and Y is defined in claim 1.

9. A compound according to claim 1, of the formula

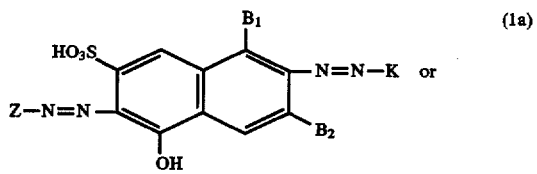

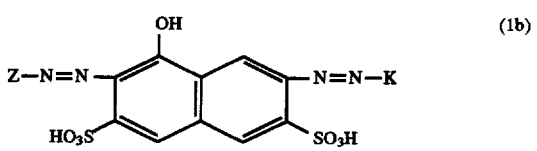

in which one of the radicals $B_1$ and $B_2$ is hydrogen and the other is sulfo, K is a radical of the formula

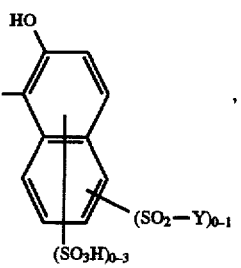

-continued

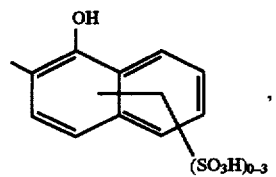 (4a")

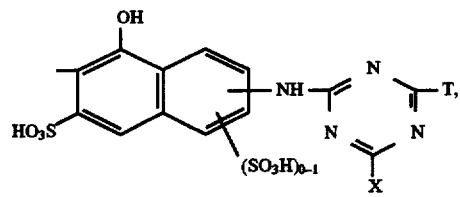 (4c')

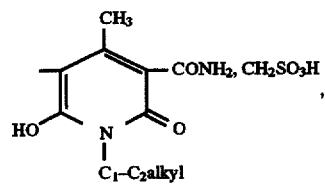 (4d')

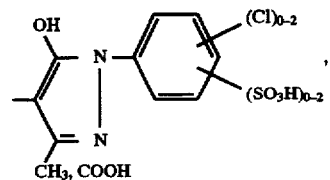 (4f')

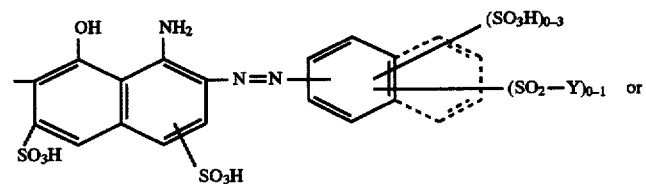 (4h')

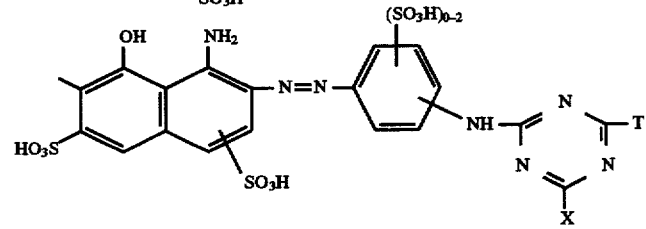 (4h")

in which

X is chlorine or fluorine,

T is amino, N-mono- or N,N-di-$C_1$-$C_4$alkylamino, in which the alkyl is unsubstituted or substituted by hydroxyl, sulfato or sulfo, morpholino or phenylamino or N—$C_1$-$C_4$alkyl-N-phenylamino, in which the phenyl is in each case unsubstituted or substituted by sulfo, carboxyl, acetylamino, methyl or methoxy, and Z is a radical of the formula

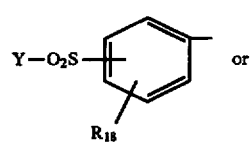 or (5a)

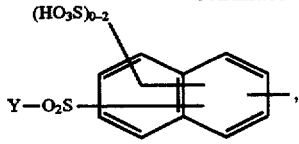 (5b)

in which $R_{18}$ is hydrogen, sulfo, methyl, ethyl, methoxy, ethoxy or chlorine, and Y is vinyl or β-sulfatoethyl.

10. A process for dyeing or printing a fibre material containing hydroxyl groups or containing nitrogen, which comprises applying to the fibre material a compound of the formula (1) according to claim 1.

11. The process according to claim 10, for dyeing or printing a fibre material containing cotton.

* * * * *